United States Patent [19]
Mitchell et al.

[11] 3,777,851
[45] Dec. 11, 1973

[54] SHAFT LUBRICATOR OPERABLE AT LOW SPEED

[76] Inventors: Paul T. Mitchell; Peter A. Pagan, both of 2277 E. 16th St., Los Angeles, Calif. 90021

[22] Filed: Mar. 16, 1972

[21] Appl. No.: 235,164

[52] U.S. Cl. .................................. 184/63, 308/85 B
[51] Int. Cl. ............................................. F16n 25/04
[58] Field of Search .................. 184/61, 62, 63, 12, 184/10; 261/34 R; 308/84 R, 84 B

[56] References Cited
UNITED STATES PATENTS

| | | | |
|---|---|---|---|
| 1,721,412 | 7/1929 | Reyes | 308/85 R |
| 1,143,307 | 6/1915 | Noyes | 184/10 |
| 1,863,183 | 6/1932 | Brady | 184/63 X |

FOREIGN PATENTS OR APPLICATIONS
508,838  10/1930  Germany............................ 308/85 B

*Primary Examiner*—Manuel A. Antonakas
*Attorney*—Charles G. Lyon et al.

[57] ABSTRACT

A lubricator for shafts, such as ship propeller shafts, during a rotation of such shafts at low speeds, the lubricator including a ring of lubricant containers which rotate with the shaft and are caused to dip in an oil sump, then carry the oil above the upper side of the shaft, and discharge the oil by gravity into a collector for distribution into the region between the bearing and the shaft; the lubricator being incorporated in a centrifugally operating lubricating means which takes over the lubricating function when the shaft speed increases.

8 Claims, 5 Drawing Figures

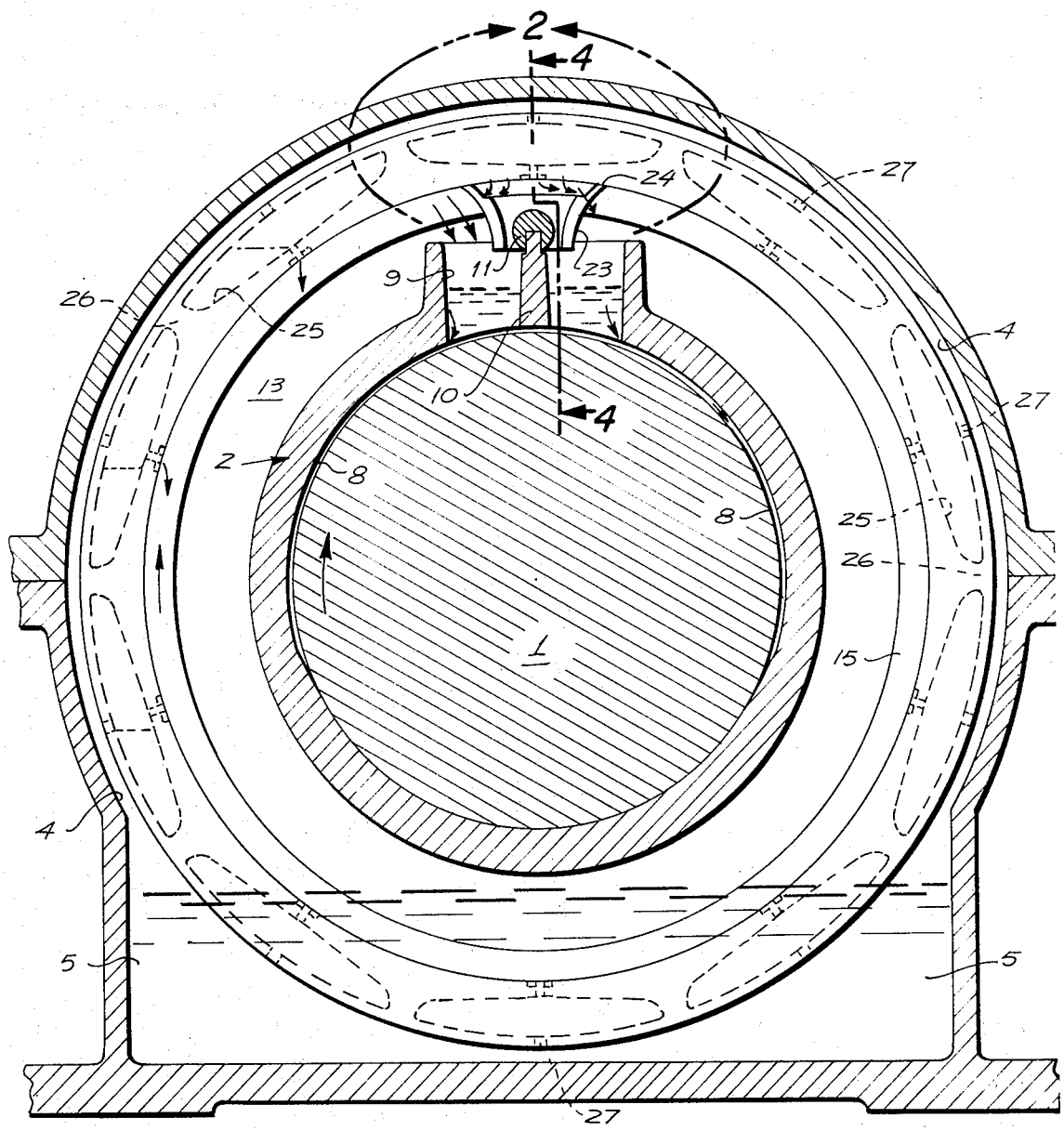
FIG. 1
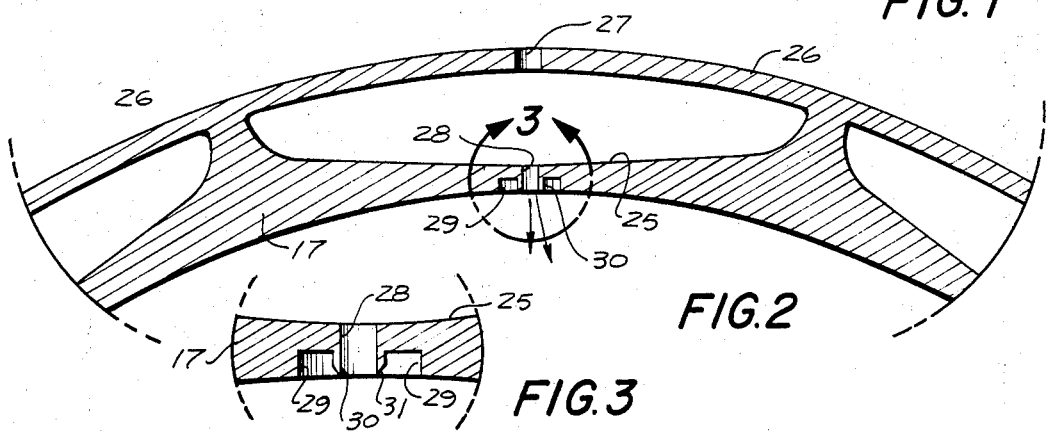
FIG. 2
FIG. 3

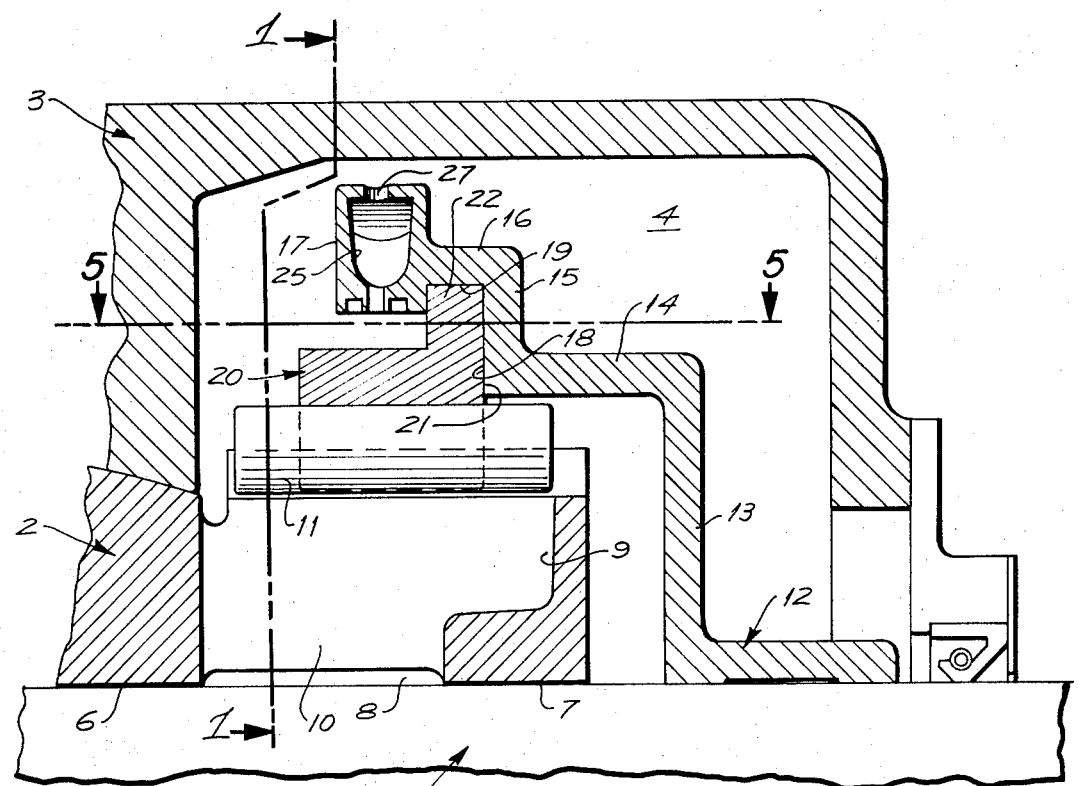
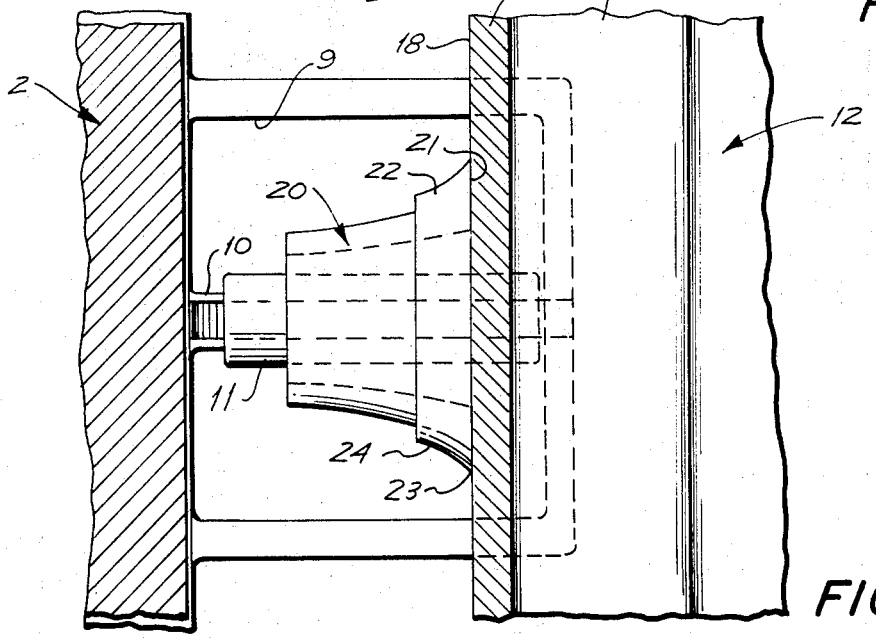

SHAFT LUBRICATOR OPERABLE AT LOW SPEED

BACKGROUND OF THE INVENTION

In the operation of large shafts, such as ship propeller shafts, it is desirable to provide means for self lubrication; that is, to rely on the rotation of the shaft itself to effect lubrication as distinguished from the use of an auxiliary pump. In such cases, centrifugal force is utilized to carry oil from an oil sump to a level above the shaft and discharge the oil into a collector for distribution between the shaft and its bearing. However, if the speed of the shaft is below that required to effect lubrication by centrifugal force, for example, if the shaft rotation by only a few rotations per minute -- or only a fraction of a rotation per minute, the shaft fails to receive lubrication. Because of the loads imposed, damage occurs even at low shaft speed.

SUMMARY OF THE INVENTION

The present invention is directed to a shaft lubricator operable at low speed and is summarized in the following objects:

First, to provide a shaft lubricator operable by shaft rotation which is particularly effective when the shaft is turning at a speed insufficient to insure lubrication by use of centrifugal force.

Second, to provide a shaft lubricator which includes a ring of novelly arranged cells rotated with the shaft so as to dip successively into an oil sump and receive successive charges of oil, then carry the oil to a level above the shaft for gravity discharge of at least a portion of the oil remaining in the cells into a collector communicating with the oil receiving region between the shaft and its bearing.

Third, to provide a lubricator as indicated in the preceding objects which may be incorporated with a centrifugal self lubricating means operable when the shaft speed is increased.

DESCRIPTION OF THE FIGURES

FIG. 1 is a sectional view taken through 1—1 of FIG. 4.

FIG. 2 is an enlarged fragmentary sectional view taken within circle 2 of FIG. 1 with the housing omitted.

FIG. 3 is a still further enlarged fragmentary sectional view taken within circle 3 of FIG. 2.

FIG. 4 is an enlarged fragmentary sectional view taken through 4—4 of FIG. 1.

FIG. 5 is a fragmentary sectional view taken through 5—5 of FIG. 4.

The lubricator is intended to be used in conjunction with a large shaft such as a propeller shaft 1 of a ship. The shaft is supported by bearings 2 which may be sleeve bearings or may be self-centering bearings as suggested in FIG. 4. Each bearing is encased in a bearing housing 3 the central portion of which supports the bearing. The housing includes end portions, one or both of which form with the shaft and bearing, an annular chamber 4 the bottom portion of which is modified to form a sump 5 intended to receive oil.

The bearing 2 includes an anit-friction bearing surface 6 which confronts the shaft and includes an oil distribution channel 8 and oil pockets, not shown, which serve to distribute lubricating oil between the bearing surface and the shaft. Formed at the upper side of the distributor channel 8 is a lubricant collector box 9 having upstanding walls and open at its upper end. The open upper side of the collector box is provided with a bridge 10 extending longitudinally with respect to the axis of the shaft 1. Mounted on the bridge is a guide bar 11 of a circular cross section.

The housing 3 extends axially beyond the bearing 2 a short distance to expose the shaft 1. Secured to the shaft is a flange structure 12. The flange structure includes a first radial portion 13 joined to a first axial portion 14 extending over the confronting end of the bearing and in turn joined to a second radial portion 15 which is joined to a second axial portion 16 overlying the collector box 9. The second axial portion 15 terminates in an enlarged ring 17. The second radial portion 15 forms a radial collector face 18 perpendicular to the axis of the shaft 1 and the radially inner side of the second axial portion 16 forms between the ring 17 and the second radial portion 15 a radially inwardly facing annular collector channel 19. All portions of parts 12, 13, 14, 15, 16 and 17 are joined together or made as a unit to comprise a single disc structure. For convenience of assembly, the disc structure may be divided into two complimentary halves.

Slidably mounted on the guide bar 11 is a shaped deflector member 20. The deflector member 20 includes an axially directed face 21 which engages the radial collector face 18 and a radially outwardly directed face 22 which engages the collector channel 19.

When the shaft 1 is rotated, the lower portion of the collector channel 19 dips progressively in the lubricating oil contained in the sump 5. If the shaft turns at sufficient speed to hold the lubricating oil in the channel 19 by centrifugal force and on the radial collector face 18 by surface adhesion, the oil is carried to the deflector member 20 so that wedge shaped edges 23 and 24 corresponding respectively to the axially directed face 21 and the radially outwardly directed face 22 deflects the oil into the collector box 9. As the shaft may rotate in either direction opposed wedge faces are provided so that in either direction of rotation of the shaft and the disc structure oil will be deflected into the collector box.

Under normal conditions of operation the amount of oil delivered to the collector box is an excess of that needed for the bearing. The excess oil spills over the top of the collector box and falls back into the sump. As the shaft speed decreases the centrifugal force available to hold the oil in the channel 19 diminishes, and the gravity effect on the oil increases until the force of gravity causes the oil to drain from the channel and the face 18 and therefore not reach the wedge shaped member 20 so that it may be deflected into the collector box 9.

In order to supply oil at reduced shaft speeds the enlarged ring 17 is provided with a ring of collector cavities or cells 25. The cells are separated by cross webs 26 so that each cell is independently sealed from adjacent cells. The radially inner walls of the cavities are curved so that their radially inner portions are mid-way between the ends of the cells. At this point each cell is provided with an inlet perforation 27 which is directed radially outward and an outlet perforation 28 which is directed radially inward. Each outlet perforation 28 is provided with a circumscribing channel 29 so as to form a radially inwardly directed projection 30 preferably but not necessarily beveled at its extremity as indicated by 31.

Operation of the shaft lubricator formed by the ring of cells is as follows:

When the shaft speed decreases to the point that centrifugal force cannot be relied upon to carry sufficient oil to the collector box, gravitational force causes the lubricating oil to enter the perforations 27 as each cell moves through the sump 5. At such slow speeds the oil has ample time to fill each cavity. As each cell moves upwardly, irrespective of the direction of rotation, some oil will fall out by gravity but a sufficient percentage remains so as to pour by gravity from the cell perforation 28 into the collector box.

The oil demand at slow shaft speed, which may in some instances be less than one revolution per minute; that is, the amount of lubrication per unit of time is less than when the shaft is turning at high speed thus, even at low speeds more than enough lubricating oil is delivered to the collector box than is required for adequate lubrication of the bearing. It should be noted that there is a range of shaft speeds in which a portion of the lubricating oil is delivered by gravity from the cells and a portion of the lubricating oil is supplied by the collector channel 19 with the result that for all shaft speeds an adequate quantity of lubricating oil is maintained.

The inlet and outlet perforations 27 and 28 are located at mid-points of their respective collector cells 25 so that the shaft may rotate in either direction and deliver, for a given speed, the same quantity of lubricating oil into the collector box 9. That is each collector cell has two opposed collector portions. If desired, two sets of collector cavities may be provided each with an inlet and an outlet located at one peripheral end, this end also being radially inner end. In this case adjacent cells extended circumferentially in opposite directions toward their perforations so that one set operates when the shaft rotates in one direction and the other set operates when the shaft rotates in the other direction.

As oil has a relatively high surface tension, in order to enhance its lubricating properties, the oil would tend to cling to the inner radial surface of the ring 17 as it emerges from the perforation 28 thus acting as an effective siphon draining the cell prematurely. This is prevented by the circumscribing channel 29 and the projection 30 which breaks the surface adhesion and its siphon effect allowing the balance of oil remaining in the cell to be carried to and emptied into the collector box 9.

If the shaft 1 has substantial axial length, as is the case with propeller shafts, the shaft may extend or contract axially a substantial amount causing the flange structure 12 to move relative to the bearing 2. The axial extent of the collector box 9 is great enough to accommodate this movement and the collector channel 19 serves to effect a corresponding movement of the deflector member 20 on its guide bar 11.

While a particular embodiment of this invention has been shown and described, it is not intended to limit the same to the details of the construction set forth, but instead, the invention embraces such changes, modifications and equivalents of the various parts and their relationships as come within the purview of the appended claims.

We claim:

1. A lubricating means for a shaft and bearing surrounded by a housing wherein a lubricant sump is provided under the shaft, and a collector box is provided above the shaft and communicates with the region between the shaft and its bearing, said lubricating means comprising:
   a. a flange structure secured to the shaft for rotation therewith;
   b. a ring structure carried by the flange structure and extending into the sump and over the collector box;
   c. the ring structure including a radially inwardly facing channel for collecting lubricant from the sump and retaining lubricant therein when the shaft is turning at a speed to cause the lubricant to be forced radially outward by centrifugal force;
   d. a deflector disposed over the collector box for directing the lubricant from the channel into the collector box;
   e. the ring structure also including a circular series of separated cavities each having a radially inwardly directed port and a cup-shaped pocket extending circumferentially in at least one direction from the port whereby, when the shaft is turning at a speed insufficient to maintain lubricant in the inwardly facing channel, lubricant is caused to flow into each pocket during movement through the sump, and a portion of the lubricant is retained in the pocket until discharged into the collector box.

2. A lubricating means as defined in claim 1, wherein:
   a. the deflector extends circumferentially in opposite directions whereby lubricant is deflected irrespective of the direction of rotation of the shaft;
   b. the pockets comprise oppositely directed circumferential pockets for carrying lubricant to the collector box irrespectively of the direction of rotation of the shaft.

3. A lubricating means as defined in claim 1, wherein:
   a. each port includes means for counter-acting the surface tension effect of the lubricant whereby the lubricant discharges as a stream.

4. Means, utilizing a lubricant sump located under a shaft and its bearing and a lubricant collector located above the shaft and its bearing and communicating with the bearing surfaces, for transferring lubricant from the sump to the collector, said means comprising:
   a. centrifugally operable means, including means carried by and rotatable with the shaft and defining a radially inwardly facing channel movable through the sump and over the collector, said channel being operable when rotated above a predetermined speed, to retain lubricant therein in response to centrifugal force, and stationary means having a portion extending into said channel for deflecting the lubricant from the channel into the collector;
   b. and means including a ring of lubricant containers rotatable with the shaft for movement in sequence through the sump to a region above the collector, each container operable when rotated below a predetermined speed, to receive and hold lubricant during movement through the sump, and to pour lubricant into the collector during movement thereover.

5. Means for supplying a liquid lubricant to the confronting surfaces of a shaft and a surrounding bearing wherein a lubricant sump is provided under the shaft and bearing, and a lubricant collector is provided in the bearing above the shaft and in communication with said confronting surfaces, the lubricating means comprising:
   a. a ring rotatable with the shaft and secured thereto in axially displaced relation to the bearing;

b. a circular series of generally cup-shaped lubricant collector cells carried by the ring, each cell including radially inner and outer walls extending circumferentially of the ring and surrounding the bearing in radially outwardly spaced relation thereto for movement in sequence through the sump and over the collector box;

c. each cell including a port at the leading end thereof with respect to the direction of rotation, whereby on movement through the sump, the cell is filled with lubricant, and on upward movement therefrom lubricant is retained in the cup-shaped cell below its port for delivery to the collector box as the cell passes over the collector box.

6. A lubricating means as defined in claim 5 wherein:
a. each cell includes a pair of cup-shaped sockets extending circumferentially in opposite directions from the port thereby to provide a first set of sockets operable upon shaft rotation in one direction and a second set of sockets operable upon shaft rotation in the opposite direction.

7. A lubricating means as defined in claim 5, wherein:
a. each cell includes a pair of ports one disposed at the radially inward side of the cell, the other disposed at the radially outward side whereby both ports form entrance openings to the cell during passage through the sump.

8. A lubricating means as defined in claim 5, wherein:
a. each port terminates in a radially inwardly projecting annular lip facilitating severance of the liquid lubricant from the port whereby the lubricant discharges as a free flowing stream.

* * * * *